(12) United States Patent
Tamura

(10) Patent No.: US 6,282,468 B1
(45) Date of Patent: Aug. 28, 2001

(54) AUTOMATIC FOLLOWING TRAVEL SYSTEM

(75) Inventor: Kazuya Tamura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/539,281

(22) Filed: Mar. 30, 2000

(30) Foreign Application Priority Data

Mar. 30, 1999 (JP) .................................................. 11-090263

(51) Int. Cl.⁷ ....................................................... G06F 7/00
(52) U.S. Cl. .................................. 701/23; 701/24; 701/26; 701/96; 340/425.5; 180/168; 180/169
(58) Field of Search .................................. 701/23, 24, 25, 701/26, 96, 93, 117, 301, 116; 340/425.5, 436, 439, 988, 903, 902, 904; 180/168, 169

(56) References Cited

U.S. PATENT DOCUMENTS 6,032,097 * 2/2000 Iihoshi et al. .......................... 701/96

FOREIGN PATENT DOCUMENTS

| | | |
|---|---|---|
| 5-170008 | 7/1993 | (JP) . |
| 8-282326 | 10/1996 | (JP) . |
| 9-083440 | 3/1997 | (JP) . |
| 10-162282 | 6/1998 | (JP) . |

* cited by examiner

Primary Examiner—William A. Cuchlinski, Jr.
Assistant Examiner—Yonel Beaulieu
(74) Attorney, Agent, or Firm—Carrier, Blackman & Associates, P.C.; Joseph P. Carrier; William D. Blackman

(57) ABSTRACT

An automatic following travel system initiates travel in file of a group of vehicles on an inclined path while maintaining a constant distance between the vehicles. During the initiation of travel in file, a travel ECU in a leading vehicle sends a directive indicating that travel in file is to be conducted to the following vehicles. Based on this directive from the leading vehicle, the travel ECUs of each of the following vehicles makes a determination as to the possibility of travel of their own vehicle, and control the movement of their own vehicle so that an approximately constant distance is maintained between their own vehicle and another vehicle positioned in front, thereof. The results of the determination of the possibility of movement are communicated to the leading vehicle. The travel ECU of the leading vehicle sends a directive indicating the release of the parking lock to the following vehicles when determinations that travel is possible have been sent from all following vehicles. Based on the directive from the leading vehicle, the travel ECUs of the following vehicles release the parking lock, and initiate the forward progress of the following vehicles in response to the leading vehicle.

4 Claims, 3 Drawing Sheets

AUTOMATIC FOLLOWING TRAVEL SYSTEM

BACKGROUND OF THE INVENTION

1. Field of the Invention

The present invention relates to an automatic following travel system wherein, among a plurality of queued vehicles, a leading vehicle positioned at the front is operated by an operator, and following vehicles positioned behind the leading vehicle automatically follow the leading vehicle so as to conduct travel in file.

This application is based on Japanese Patent Application No. 11-90263, the contents of which are incorporated herein by reference.

2. Background Art

As is commonly known, systems have been proposed wherein small electric vehicles are used in common by a plurality of users in a defined region, and thereby, efficient use of the vehicles is achieved, and by means of this, problems such as congestion and insufficient space are relieved, and a savings in resources and energy, as well as an improvement in environmental contamination, are achieved.

In other words, dedicated parking, termed ports, is established at a number of places within a limited region, and users are able to freely borrow vehicles from these ports, and furthermore, after the use of the vehicles, the vehicles may be returned to the ports. By means of this, users are able to employ the vehicles only when they are required. Furthermore, if there are a large number of ports, it will not be necessary to search for parking spaces or to park along the side of the road, and it is thus possible to alleviate congestion.

However, in such a system, as a result of the locations at which the ports are established or the like, there are concerns that vehicles may become concentrated at some ports, while at other ports, vehicles will become insufficiently available.

Techniques have been proposed for moving a plurality of vehicles efficiently between ports so as to easily remedy this imbalance of vehicles existing between ports (for example, in Japanese Patent Application, First Publication, No. Hei 5-170008). In this technique, among a plurality of queued vehicles, only the leading vehicle, which is positioned at the front, is manually operated by an operator, and the operation of the following vehicles is automatically controlled based on data relating to the amount of driving operation of the leading vehicle which is transmitted from the leading vehicle. By means of this, driving is controlled so that the following vehicles trace the same track as the leading vehicle, and as a result, a state is realized in which a series of vehicles travel in such a manner as to form a file with the leading vehicle in the front (travel in file). At this time, because the operation of the following vehicles is automatically controlled, unmanned operation is possible, and it is possible to reduce the number of humans involved.

In order to realize the travel in file described above, it is necessary to recognize a series of vehicles as a group of vehicles, and to conduct automatic operation control with respect to the vehicles recognized as being members of the group of vehicles by means of data related to the amount of driving operation similar to that of the leading vehicle, or to conduct positional control for maintaining a constant distance between vehicles.

Accordingly, when travel in file is terminated, if the recognition of a series of vehicles as vehicles within a single group is canceled, then simultaneously, the automatic operation control and the positional control of the following vehicles is also canceled, and in particular, in cases such as that in which traveling in file is terminated in an inclined traveling path, it becomes impossible to maintain a constant position of the following vehicles.

Furthermore, in the automatic operation control such as that described above, in order that the following vehicles be satisfactorily able to trace the track of the leading vehicle, during travel in file, operations identical to predetermined operations in the leading vehicle are carried out in the following vehicles when the following vehicles pass through a position which is the same as that at which the predetermined operations were conducted in the leading vehicle. However, when this type of control is applied to operations such as parking braking, then during the formation of the traveling in file, even if the leading vehicle releases its parking braking so as to initiate forward progress, the following vehicles are incapable of releasing their parking braking until they reach the position of the leading vehicle, and they are not capable of initiating forward progress. Furthermore, if, in order to avoid this problem, control content is simply added in which the following vehicles release their parking braking at the same time at which a leading vehicle releases its parking braking, then if travel in file is to be initiated on an inclined path, when a state is produced in which the parking braking of the leading vehicle is released prior to the initiation of the control by which a constant distance is maintained by the following vehicle, then a constant position of the following vehicles cannot be maintained.

SUMMARY OF THE INVENTION

It is therefore an object of the present invention to provide an automatic following travel system which is capable of conducting forward progress and stoppage during the initiation and termination of travel in file while maintaining a fixed distance between vehicles, particularly on an inclined path.

In a first aspect of the present invention, in the automatic following travel system (for example, the automatic following travel system 1 in the embodiment), among a plurality of queued vehicles (the vehicles 3), a leading vehicle (the leading vehicle 3') positioned at the front is driven by an operator, and following vehicles (the following vehicles 3") positioned behind the leading vehicle automatically follow the leading vehicle, and are made to travel in file.

Each vehicle has a vehicle position maintaining device (the electrically operated parking operation part 22) for maintaining a constant position during stoppage, a communicator (the communication unit 5) for conducting communications with other vehicles, and a controller (the travel ECU 6) for controlling operations of the vehicle position maintaining device and communicator and for controlling travel of the vehicle.

During the initiation of travel in file, the controller of the leading vehicle (the travel ECU 6') sends a directive to the following vehicles via the communications mechanism indicating that travel in file is to be conducted (step Sa5).

Controllers of the following vehicles (the travel ECUs 6") make a determination as to the possibility of travel of their own vehicles, based on the directive from the leading vehicle (step Sb3), control the operation of their own vehicles so as to maintain an approximately constant distance between their vehicle and another vehicle positioned in front (control by means of inter-vehicle distance maintaining part 21 in step Sb4), and communicate the results of the determination of the possibility of travel to the leading vehicle (step Sb5).

When a determination that travel is possible has been communicated from all following vehicles, the controller of the leading vehicle sends a directive canceling the operation of the vehicle position maintaining device to all following vehicles (step Sa7).

The controllers of the following vehicles cancel the operation of the vehicle position maintaining device based on the directive canceling operation thereof (step Sb6), and initiate forward progress of the following vehicles in response to the initiation of forward progress of the leading vehicle, and thereby, travel in file is conducted.

By means of this invention, during the initiation of travel in file, when the operation of the vehicle position maintaining device in the following vehicles is canceled, the controller constantly maintains a constant distance between each vehicle and the vehicle in front of it, so that even if the following vehicles are on an inclined path, it is possible to maintain a standby state for forward progress while maintaining a constant distance from the leading vehicle without depending on the vehicle position maintaining device.

In a second aspect of the present invention, in the automatic following travel system described above, when travel in file is halted, the controller of the leading vehicle sends a directive indicating operation of the vehicle position maintaining device to the following vehicles (step Sa12). The controllers of the following vehicles operate the vehicle position maintaining device based on the directive from the leading vehicle (step Sb11), and terminate control which maintains a constant distance between their own vehicle and another vehicle positioned in front (step Sb14).

In accordance with this invention, during the termination of travel in file, the vehicle position maintaining devices of the following vehicles are operated before the termination of the control of the control mechanisms of the following vehicles which maintains a constant distance between vehicles, so that even on an inclined path, each vehicle may be halted while maintaining a constant position.

As described above, in the automatic following travel system, or the invention during the initiation of travel in file, when the operation of the vehicle position maintaining device is canceled in the following vehicles, a constant distance is always maintained between a vehicle and the vehicle in front of it by the controller, so that it is possible to realize a standby state for the initiation of travel in file in which the following vehicles maintain a constant distance from the leading vehicle in a state in which the operation of the vehicle position maintaining device is canceled, even on an inclined path.

Accordingly, unlike in the prior art, it is possible to satisfactorily initiate travel in file even on an inclined path, and thus the conditions for the path surface at the position at which travel in file is initiated are not restricted to flat areas, and a system may be realized which has wide applicability.

In the latter automatic following travel system, during the termination of travel in file, it is possible to operate the vehicle position maintaining device in the following vehicles prior to terminating the control of the controller of the following vehicles which maintains a constant inter-vehicle distance, so that even where an attempt is made to terminate travel in file on an inclined path, it is possible to halt each vehicle in such a way that a constant position is maintained. Accordingly, unlike in the prior art, it is possible to satisfactorily terminate travel in file even on an inclined path, and the conditions for the path surface at the position at which travel in file is terminated are not restricted to flat areas, and it is possible to realize a system having wide applicability.

BRIEF DESCRIPTION OF THE DIAGRAMS

DETAILED DESCRIPTION OF THE PREFERRED EMBODIMENTS

An embodiments of the invention will be explained based on the figures.

Figure 1:
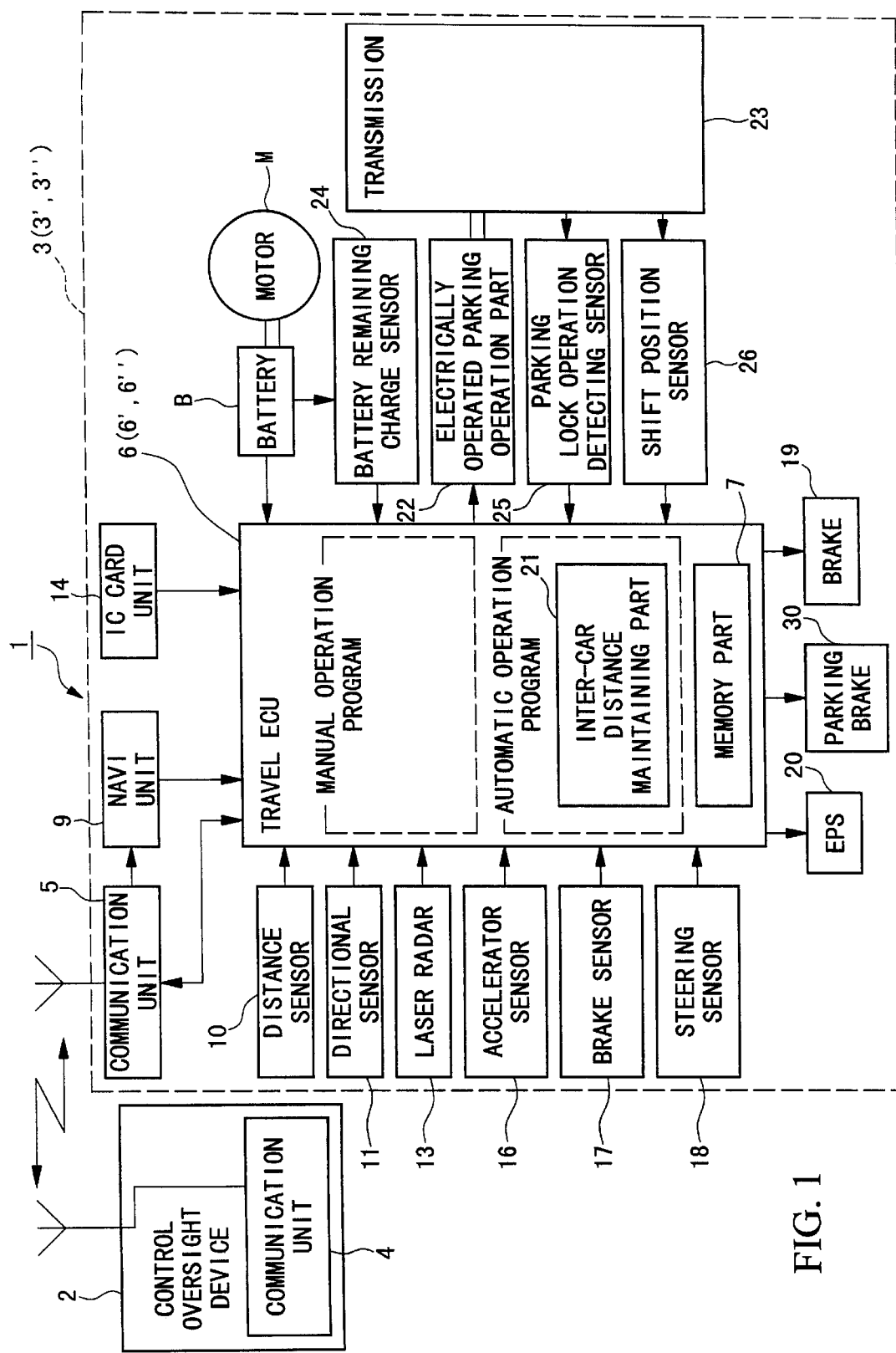
FIG. 1 is a block diagram of an automatic following travel system showing an embodiment of the present invention.

FIG. 1 is a block diagram showing the structure of an automatic following travel system 1 in accordance with an embodiment of the present invention. As shown in the figure, automatic following travel system 1 generally comprises a control oversight device 2 and a plurality of vehicles 3. Here, for purposes of simplicity, only a single vehicle 3 is depicted.

The control oversight device 2 comprises a CPU and a memory apparatus, and is capable of exchanging signals with the travel ECU 6 of vehicles 3 via communication unit 4 and the communication unit 5 which is installed in each of the vehicles 3.

Furthermore, the control oversight device 2 designates a plurality of vehicles 3 as vehicles which are to conduct travel in file, and conducts the leading control of these designated vehicles 3 so as to call forth these vehicles in sequence into a specific region within a dedicated port and arrange them in a queue.

Vehicles 3 are constructed as an electric vehicle which is provided with a motor M and a battery B, and the motor M, which is supplied with electric power from the battery B, conducts drive control by means of a travel ECU 6, and in this manner, the vehicle travels.

The travel ECU 6 comprises a CPU, and this conducts the control described hereinbelow in accordance with a program which is stored in the memory part 7 thereof.

In other words, based on the detection results from a NAVI unit 9, which detects the current position and the like of vehicle 3 by means of signals from a man-made satellite inputted from communication unit 5, a distance sensor 10, which calculates the travel distance of vehicle 3, and a directional sensor 11, which detects the direction of progress of vehicle 3, the travel ECU 6 detects the position of the vehicle and the direction of travel of the vehicle at fixed intervals and stores these in the storage part 7 as track data. Furthermore, the position of the vehicle and the direction of travel of the vehicle which were detected in this manner are constantly transmitted to the control oversight device 2 and to the other vehicles.

Furthermore, based on the detection results of a laser radar 13 provided at the front part of vehicle 3, when the vehicles 3 are traveling in file the travel ECU 6 calculates the distance to the vehicle 3 positioned immediately in front and the direction thereto.

Furthermore, the travel ECU 6 has a structure such that it is switchable. So that, particularly when an IC card (not depicted in the figure) is inserted into an IC card unit 14 which is provided in vehicle 3, the travel ECU 6 executes a manual operation control program, while, when there are directives from other vehicles 3 via communication unit 5, the travel ECU 6 executes an automatic operation control program.

When the manual operation program is executed, the travel ECU 6 refers to the operational amount of the accelerator pedal which is detected by the accelerator sensor 16 provided on the accelerator pedal (not depicted in the figure), to the operational amount of the brake pedal which is detected by the brake sensor 17 provided on the brake pedal (not depicted in the figure), and to the operational amount of the steering detected by the steering sensor 18 which is provided at the steering mechanism (not depicted in the figure), and based on these, the travel ECU 6 calculates the control torque T (Nm) which is the operational amount of the motor M corresponding to the degree of opening of the accelerator, as well as the brake hydraulic pressure P ($N/M^2$), and the steering angle ω(deg). Then, based on the results of this calculation, the travel ECU 6 controls the operation of the motor M, the brake 19, and an electronic power steering EPS 20.

On the other hand, when the automatic operation control program is executed, the travel ECU 6 refers to the operational amounts of the accelerator pedal, the brake pedal, and the steering mechanism in a vehicle 3 which is positioned at the front when the vehicles 3 travel in a file (hereinbelow referred to as leading vehicle 3'), as well as to the travel track of leading vehicle 3', via the communication unit 5, and controls the operational amounts of the motor M, the brake 19, and the EPS 20 of its own vehicle, so that it is capable of tracing the track of the leading vehicle 3'. (For this reason, it is a necessary predicate in order to start up the automatic operation control program in travel ECU 6 that the vehicles 3 be the vehicles 3 which travel in file behind the leading vehicle 3' (hereinbelow referred to as following vehicles 3"). Furthermore, the directive indicating startup of the automatic operation control program is conducted from the leading vehicle 3' via the communication unit 5.)

Furthermore, when the automatic operation control program is executed in this way, based on the detection results from the NAVI unit 9, the distance sensor 10, the directional sensor 11, and the laser radar 13, the travel ECU 6 corrects the operational amounts of the motor M, the brake 19, and the EPS 20 using the inter-vehicle distance maintaining part 21 which forms a part of the travel ECU 6 so that a fixed inter-vehicle distance (for example 4 m) is maintained between a vehicle 3 and the vehicle positioned in front of that vehicle. In this embodiment, the vehicle in front is the vehicle positioned immediately in front of the vehicle 3, and may be the leading vehicle.

Furthermore, when the automatic operation control program is executed, the travel ECU 6 locks or releases the gears of the transmission 23 by means of an electrically operated parking operation part 22, and is thus capable of operating or releasing the parking lock.

Additionally, travel ECU 6 refers to the detection results from accelerator sensor 16, brake sensor 17, steering sensor 18, and the battery remaining charge sensor 24 which detects the remaining battery charge of battery B and is provided on battery B, and performs a diagnostic of its own vehicle.

Furthermore, a parking lock operation detecting sensor 25 and a shift position sensor 26 are provided on the transmission 23. The parking lock operation detecting sensor 25 detects whether or not the parking lock is operating normally, and outputs the result of this detection to the travel ECU 6. Furthermore, the shift position sensor 26 detects the shift position of the transmission 23, and outputs the results of this detection to the travel ECU 6.

Next, an explanation will be given with respect to the order when the travel in file of a plurality of vehicles 3 is initiated in this automatic following travel system 1.

First, the control oversight device 2 designates a plurality of vehicles 3 (hereinbelow referred as to a group of vehicles) as vehicles which are to conduct travel in file, and so controls these vehicles 3 as to lead them to a predetermined travel initiation point (for example, the dedicated port of the vehicles 3) and causes them to stop in queue. Next, control oversight device 2 recognizes, among the queued vehicles 3, that vehicle which is positioned at the front as the leading vehicle 3', and the vehicles 3 which are positioned behind the leading vehicle 3' as following vehicles 3".

Figure 2:
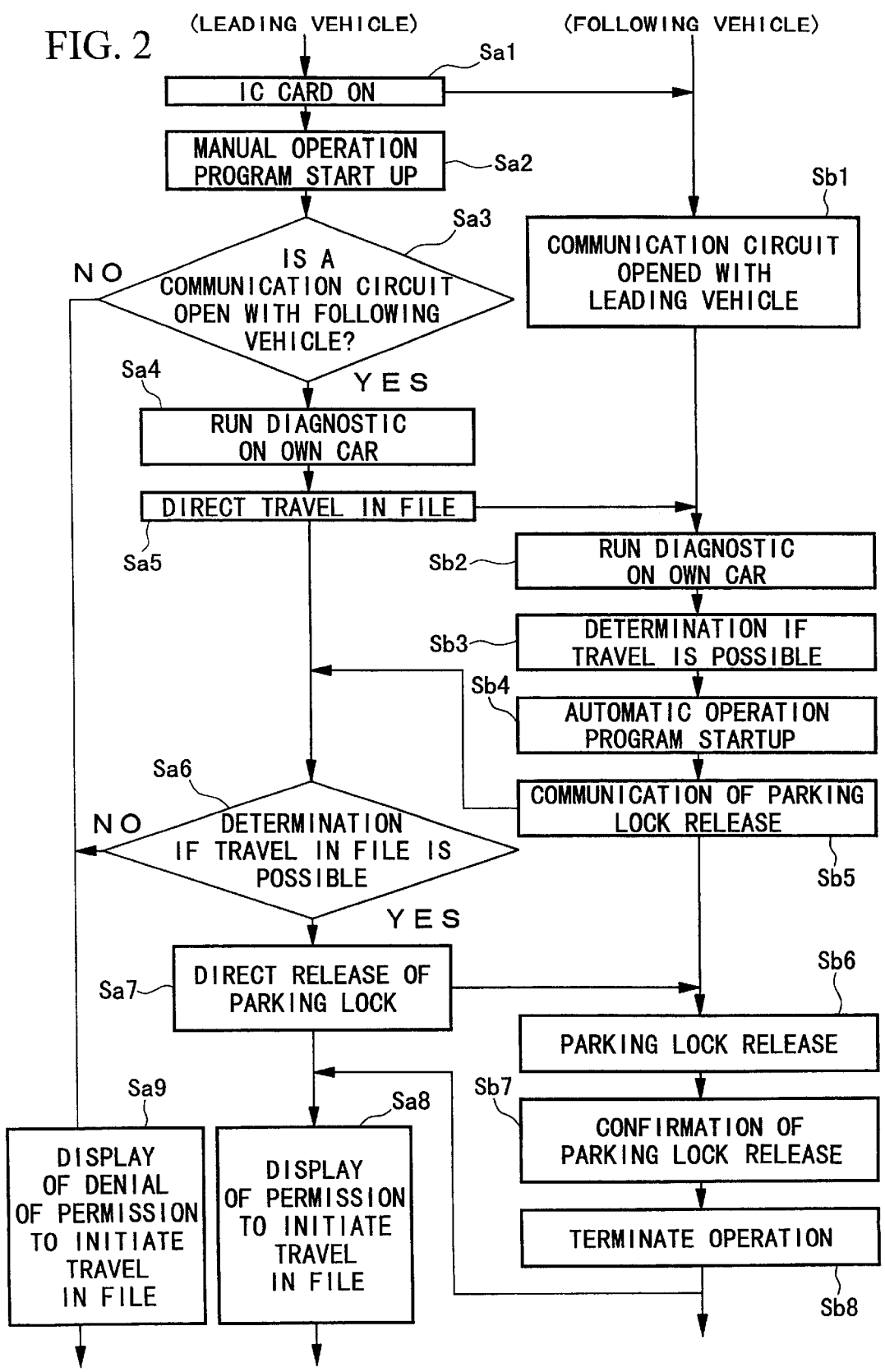
FIG. 2 is a flowchart showing the order of processing conducted by the travel ECU of the leading vehicle and the following vehicles during the initiation of travel in file in the automatic following travel system shown in FIG. 1.

Next, among the queued vehicles 3, an operator boards the leading vehicle 3', and by manually operating this leading vehicle 3', initiates travel in file. However, in this case, the travel ECU 6 of leading vehicle 3' (hereinbelow referred to as travel ECU 6') and the travel ECUs 6 of the following vehicles 3" (hereinbelow referred to as travel ECUs 6") operate in the manner of a time series as shown in FIG. 2, following the programs stored in memory part 7.

The operator who has boarded the leading vehicle 3' inserts an IC card into the IC card unit 14 (step Sa1), and in travel ECU 6', the manual operation program is initiated (step Sa2).

On the other hand, the travel ECU 6' opens a communication circuit with the travel ECU 6" of the following vehicles 3" via the communication unit 5 (step Sa3). Furthermore, by means of this, in following vehicles 3", as well, the travel ECUs 6" open communication circuits with the ECU 6' of the leading vehicle 3' (step Sb1).

The travel ECU 6' opens a communication circuit with the following vehicles 3", and then performs a diagnostic of its own vehicle (step Sa4). Then, it sends a directive directing travel in file to the following vehicles 3" (step Sa5).

The travel ECU 6" of the following vehicles 3" receive the directive from the leading vehicle 3', perform a diagnostic of their own vehicles (step Sb2), and based on this, make a determination as to whether or not their own vehicles are capable of travel (step Sb3), and, at this time, if the results of this determination are that their own vehicle (following vehicle 3") is capable of travel, they initiate an automatic operation program (step Sb4). By means of this, the inter-vehicle distance maintaining part 21 of travel ECU 6" initially conducts control so as to maintain a constant inter-vehicle distance (4 meters) between the following vehicle 3" and the vehicle 3 positioned immediately in front of it. Furthermore, the travel ECUs 6" of the following vehicles 3" communicate the results of the determination of the possibility of travel of their own vehicles to the leading vehicle 3' (step Sb5).

Based on the results of the determination as to the possibility of travel transmitted from the following vehicles 3" and the results of the diagnostic of its own vehicle (leading vehicle 3'), the travel ECU 6' of the leading vehicle 3' conducts a determination as to whether or not all vehicles 3 are capable of travel in file (step Sa6), and when a determination has been made that travel in file is possible, the travel ECU 6' sends a directive releasing the parking lock to the following vehicles 3" (step Sa7).

Receiving this, the travel ECUs 6" of the following vehicles 3" release the lock of the transmission 23 by means of the electrically operated parking operation parts 22, and release the parking lock (step Sb6).

Furthermore, the travel ECUs 6" of the following vehicles 3" recognize whether or not the parking lock of their vehicles has been released based on the output of the parking lock operation detecting sensor 25 (step Sb7), and when the release has been conducted normally, transmit the fact that the parking lock release operation has been completed to the leading vehicle 3' (step Sb8). By means of this, the travel ECU 6' of the leading vehicle 3' conducts a display of the permission to initiate travel in file on a control panel of the leading vehicle 3' which is not depicted in the figure (step Sa8). A plurality of lamps corresponding to the vehicles 3 which are to travel in file are arranged in a row on this control panel, and the display of the permission to initiate travel in file is conducted by lighting all of these lamps in green for example.

Furthermore, if in step Sa3, a communication circuit is not open with the following vehicles 3", and if, in step Sa6, a determination has not been made that travel in file is possible, the travel ECU 6' displays a denial of permission to initiate travel in file in the control panel of the leading vehicle 3' which is not depicted in the figure (step Sa9). In this case, the display of the denial of permission to initiate travel in file is conducted by lighting in red the lamps, among the lamps arranged in a row on the control panel, corresponding to the following vehicles 3" for which a communication circuit was not opened, or which transmitted a determination that travel was not possible. By means of this, the operator may be made aware that some trouble has occurred in one or more of the following vehicles 3".

Next, the operator who has boarded the leading vehicle 3' recognizes the fact that, among the lamps of the control panel, all lamps corresponding to the vehicles 3 are lit in green, and initiates the forward progress of the leading vehicle 3'. At this time, the inter-vehicle distance maintaining part 21 of the travel ECU 6" of the following vehicle 3" positioned immediately to the rear of the leading vehicle 3 controls the travel of the following vehicle 3" so as to maintain a constant distance from the leading vehicle 3'. That is to say, the result is that in response to the initiation of forward progress by the leading vehicle 3', the following vehicle 3" immediately to the rear thereof also initiates forward progress. Then, with respect to the following vehicles 3" positioned further to the rear of the following vehicle 3" immediately behind the leading vehicle 3', in the same way, the inter-vehicle distance maintaining part 21 of the travel ECU 6" of each vehicle controls the travel of its own vehicle so as to maintain a constant distance between its own vehicle and the vehicle immediately in front of it, and by means of this, travel in file is initiated.

Figure 3:
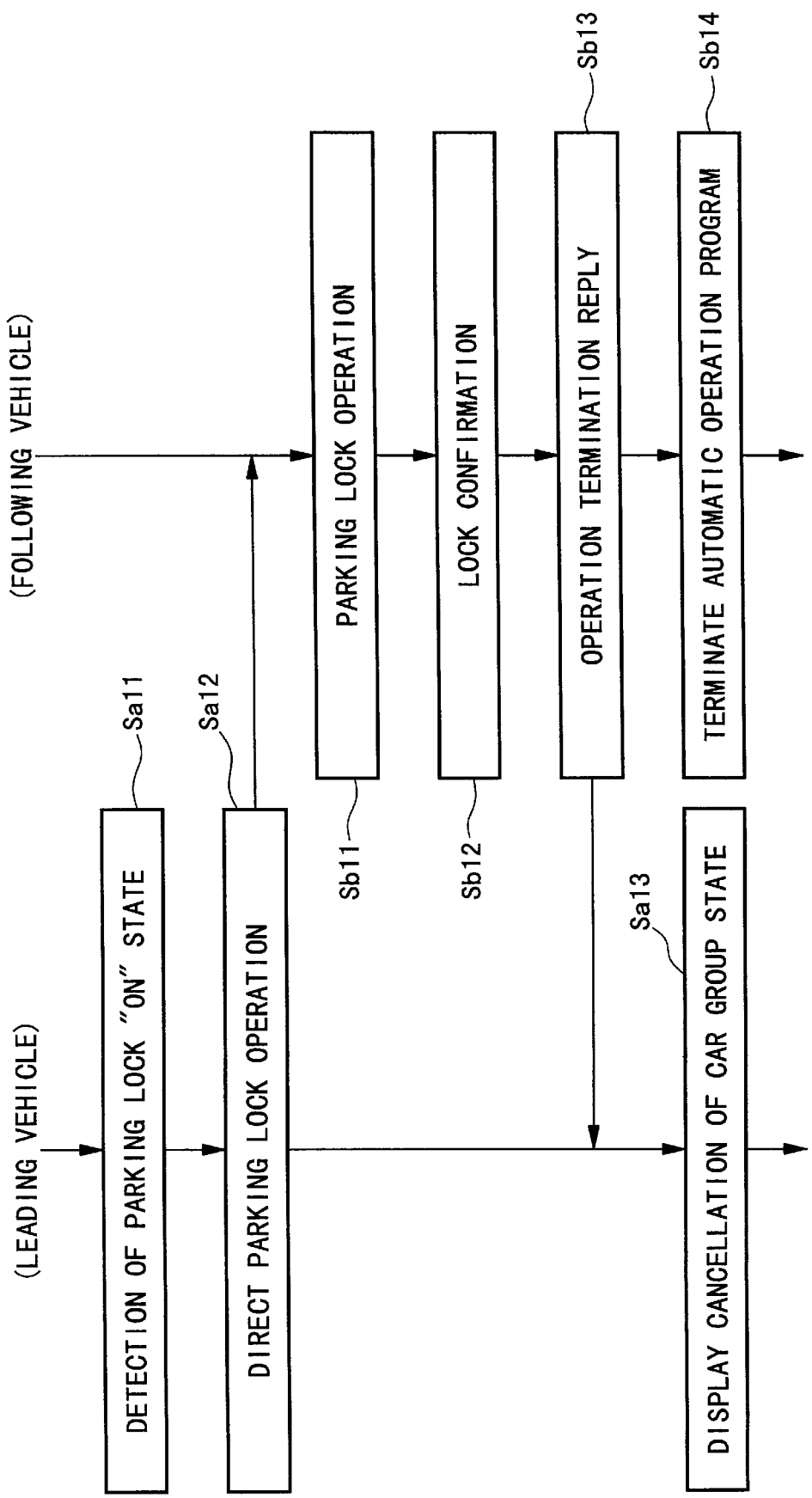
FIG. 3 is a flowchart showing the order of processing conducted by the travel ECU of the leading vehicle and the following vehicles during the termination of travel in file in the automatic following travel system shown in FIG. 1.

The foregoing indicated the concrete order during the initiation of travel in file; in the following, the order during the termination of travel in file will be explained. FIG. 3 shows the order of operation of the travel ECUs 6' and 6" in the leading vehicle 3' and the following vehicles 3" during the termination of travel in file in the manner of a time series.

First, when the vehicles 3 reach the predetermined point at which travel in file is terminated and when the operator of leading vehicle 3' places the gear in the parking position, this is detected by the shift position sensor 26, and the travel ECU 6' confirms that the parking lock has been turned on (step Sa11). Next, this functions as a trigger, and the travel ECU 6' sends a directive to operate the parking lock to the following vehicles 3" (step Sa12).

By means of this, in the following vehicles 3", based on the directive from the leading vehicle 3', the electrically operated parking operation part 22 of the travel ECUs 6" operates the parking lock of its own vehicle (following vehicle 3") (step Sb11).

After this, in the following vehicles 3", the travel ECUs 6" recognize whether or not the parking lock has functioned normally based on the results outputted by the parking lock operation detecting sensors 25 (step Sb12), and when the parking lock has functioned normally, send a signal conveying that the parking lock operation has been completed to the leading vehicle 3' (step Sb13). After this, the travel ECUs 6" terminate the automatic operation program (step Sb14). In this case, the control maintaining a constant inter-vehicle distance carried out by the inter-vehicle distance maintaining part 21 is simultaneously terminated.

On the other hand, based on the transmissions from the following vehicles 3", the travel ECU 6' of the leading vehicle 3' conducts a display indicating that the travel in file has been terminated and that the group state of vehicles 3 has been canceled, in a control panel which is not depicted in the figure (step Sa13).

In the control in the automatic following travel system 1 described above, during the initiation of travel in file, when the parking lock is released in the following vehicles 3", a constant inter-vehicle distance between a vehicle and the vehicle immediately in front of it is reliably maintained by the inter-vehicle distance maintaining part 21 of travel ECU 6" so that following vehicles 3" are capable of realizing a standby state for the initiation of travel in file in which the parking locks are released while maintaining a constant distance from the leading vehicle 3' even on an inclined path. Accordingly, unlike in the prior art, it is possible to satisfactorily initiate travel in file even on an inclined path, and the necessary conditions for the path surface at the point at which travel in file is initiated are not restricted to flat areas, and as such a system is realized which has wide applicability.

Furthermore, in the control in the automatic following travel system 1 described above, during the termination of travel in file, prior to the termination of control maintaining a constant inter-vehicle distance conducted by the travel ECU 6", it is possible to operate the parking lock of the following vehicles 3", so that even where an attempt is made to terminate the travel in file on an inclined path, it is possible to stop the vehicles 3, while maintaining a constant position thereof. Accordingly, in contrast to the prior art, it is possible to satisfactorily terminate the travel in file even on an inclined path, and thus the path surface conditions for the place at which travel in file is terminated are not restricted to flat areas, and thus a system is realized which is capable of wide applicability.

The above represents an embodiment of the present invention; the present invention is in no way restricted to this embodiment, and it is possible to adopt other structures to the extent that these do not depart from the essential ideas thereof.

Furthermore, in the embodiment described above, a parking lock was adopted as the mechanism for fixing the position of each vehicle 3; however, in place of this, it is possible to adopt a parking brake 30 (see FIG. 1) or other mechanism. In such a case, the travel ECUs 6" in the following vehicles 3" should have a structure which is capable of controlling the engaging and releasing of the parking brake 30 or other mechanism.

What is claimed is:

1. An automatic following travel system wherein, among a plurality of queued vehicles, a leading vehicle positioned at the front is driven by an operator, and following vehicles positioned behind said leading vehicle automatically follow said leading vehicle, and are made to travel in file; wherein:

each of said vehicles has a vehicle position maintaining device for automatically maintaining a constant position during stoppage, a communicator for conducting communication with other said vehicles, and a controller for controlling operations of said vehicle position maintaining device and said communicator and for controlling travel of said vehicle;

during initiation of travel in file, said controller of said leading vehicle sends a directive to said following vehicles via said communicator indicating that travel in file is to be conducted;

said controllers of said following vehicles make a determination as to the possibility of travel of their own vehicles, based on said directive from said leading vehicle, control the operation of their own vehicles so as to maintain an approximately constant distance between their vehicle and another said vehicle positioned in front thereof, and communicate the results of the determination of the possibility of travel to said leading vehicle;

when a determination that travel is possible has been communicated from all said following vehicles, said controller of said leading vehicle sends a directive canceling the operation of said vehicle position maintaining device to all said following vehicles; and said controllers of said following vehicles cancel the operation of said vehicle position maintaining devices thereof based on said operation canceling directive, and initiate forward progress of said following vehicles in response to the initiation of forward progress of said leading vehicle, and travel in file is conducted.

2. An automatic following travel system in accordance with claim 1, wherein:

when said travel in file is halted, said controller of said leading vehicle sends a directive indicating operation of said vehicle position maintaining device to said following vehicles, and said controllers of said following vehicles operate said vehicle position maintaining devices thereof based operation indicating on said directive from said leading vehicle, and terminate control which maintains a constant distance between their own vehicle and another said vehicle positioned in front thereof.

3. An automatic following travel system in accordance with claim 1, further including means for providing a driver of said leading vehicle with an indication of whether it is permissible to initiate travel in file.

4. An automatic following travel system in accordance with claim 1, wherein said vehicle position maintaining devices comprise vehicle transmission parking locks.

* * * * *

UNITED STATES PATENT AND TRADEMARK OFFICE
CERTIFICATE OF CORRECTION

PATENT NO. : 6,282,468 B1
DATED : August 28, 2001
INVENTOR(S) : Tamura

It is certified that error appears in the above-identified patent and that said Letters Patent is hereby corrected as shown below:

Title page,
Item [57] ABSTRACT,
Line 12, after "front" delete the comma.

Column 3,
Line 41, change "system, or the invention" to -- system of the invention, --.

Column 4,
Line 19, change "An embodiments" to -- Embodiments --;
Line 67, change "So that, particularly" to -- Particularly, --.

Column 5,
Line 20, change "N/M$^2$" to -- N/m$^2$ --.

Column 6,
Line 9, change "as to" to -- to as --.

Column 7,
Line 17, after "green" insert a comma;
Line numbered between 24 and 25, change "lamps" to -- lamp(s) --;
Line numbered between 26 and 27, change "vehicles" to -- vehicle(s) --.

Column 10,
Line 16, change "operation indicating on said" to -- on said operation indicating --.

Signed and Sealed this

Twelfth Day of March, 2002

*Attest:*

*Attesting Officer*

JAMES E. ROGAN
*Director of the United States Patent and Trademark Office*